United States Patent
Oliver et al.

(10) Patent No.: US 9,142,881 B1
(45) Date of Patent: *Sep. 22, 2015

(54) RFID TAG CIRCUITS WITH FLOATING DIFFERENTIAL INPUTS

(75) Inventors: Ronald A. Oliver, Seattle, WA (US); Harley K. Heinrich, Snohomish, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 1281 days.

This patent is subject to a terminal disclaimer.

(21) Appl. No.: 12/483,842

(22) Filed: Jun. 12, 2009

Related U.S. Application Data

(60) Provisional application No. 61/093,252, filed on Aug. 29, 2008.

(51) Int. Cl.
| | |
|---|---|
| *G08B 13/14* | (2006.01) |
| *G08C 19/12* | (2006.01) |
| *G05B 11/01* | (2006.01) |
| *G08C 19/16* | (2006.01) |
| *H01Q 21/00* | (2006.01) |
| *H01Q 19/10* | (2006.01) |
| *H01Q 21/26* | (2006.01) |
| *H01Q 1/24* | (2006.01) |
| *H01Q 21/30* | (2006.01) |
| *G06K 19/07* | (2006.01) |
| *G06K 19/077* | (2006.01) |
| *H01Q 1/22* | (2006.01) |

(52) U.S. Cl.
CPC ............ *H01Q 1/248* (2013.01); *G06K 19/0724* (2013.01); *G06K 19/07767* (2013.01); *H01Q 1/2225* (2013.01); *H01Q 21/30* (2013.01); *H04Q 2213/095* (2013.01)

(58) Field of Classification Search
CPC ................. G06K 19/0723; G06K 19/07749; G06K 7/0008; G06K 19/0701; G06K 19/07767; G06K 7/10128; G06K 7/10356; G06K 19/04; G06K 19/07758; G06K 19/07788; G06K 2017/0051; G06K 7/10108
USPC ........................................... 340/572.1–572.9
See application file for complete search history.

(56) References Cited

U.S. PATENT DOCUMENTS

| | | | |
|---|---|---|---|
| 5,491,468 A | 2/1996 | Everett et al. | |
| 5,510,769 A | 4/1996 | Kajfez et al. | |
| 6,243,013 B1 * | 6/2001 | Duan et al. ................. | 340/572.7 |
| 6,617,963 B1 | 9/2003 | Watters et al. | |
| 6,812,824 B1 | 11/2004 | Goldinger et al. | |
| 7,183,994 B2 | 2/2007 | Weigand | |
| 7,477,196 B2 | 1/2009 | Asrani et al. | |

(Continued)

OTHER PUBLICATIONS

Final Office Action received for U.S. Appl. No. 13/196,877, mailed Jul. 7, 2014 and filed Aug. 2, 2011.

(Continued)

*Primary Examiner* — Steven Lim
*Assistant Examiner* — Muhammad Adnan
(74) *Attorney, Agent, or Firm* — Turk IP Law, LLC

(57) ABSTRACT

An Integrated Circuit (IC) for an RFID tag and a tag including such an IC are provided where the IC includes at least two rectifiers and two antenna ports for connecting to two respective antennas with at least three of the four antenna terminals not sharing a reference potential of the IC. According to other embodiments, the antenna ports are also electrically isolated from each other.

19 Claims, 13 Drawing Sheets

(56) References Cited

U.S. PATENT DOCUMENTS

| | | | |
|---|---|---|---|
| 7,511,621 B1* | 3/2009 | Duan et al. | 340/572.7 |
| 7,579,955 B2* | 8/2009 | Pillai | 340/572.4 |
| 7,994,923 B2 | 8/2011 | Watanabe et al. | |
| 8,026,818 B2 | 9/2011 | Cote et al. | |
| 8,258,958 B2 | 9/2012 | Kang et al. | |
| 8,350,701 B2 | 1/2013 | Carrender et al. | |
| 8,544,758 B2 | 10/2013 | Wilkinson | |
| 2001/0035813 A1* | 11/2001 | Meier | 340/5.72 |
| 2001/0048361 A1 | 12/2001 | Mays | |
| 2002/0021249 A1* | 2/2002 | Kuck | 343/700 MS |
| 2003/0013146 A1 | 1/2003 | Werb | |
| 2005/0248438 A1 | 11/2005 | Hughes et al. | |
| 2006/0145855 A1 | 7/2006 | Diorio et al. | |
| 2007/0126583 A1* | 6/2007 | Maniwa et al. | 340/572.2 |
| 2007/0128760 A1* | 6/2007 | Subramanian et al. | 438/57 |
| 2007/0216533 A1 | 9/2007 | Hyde et al. | |
| 2007/0222610 A1 | 9/2007 | Tagato | |
| 2007/0279231 A1* | 12/2007 | Cheng et al. | 340/572.7 |
| 2008/0054638 A1* | 3/2008 | Greene et al. | 290/1 R |
| 2008/0055092 A1* | 3/2008 | Burr | 340/572.7 |
| 2008/0080214 A1* | 4/2008 | Umeda et al. | 363/37 |
| 2009/0115574 A1 | 5/2009 | Tien et al. | |
| 2009/0117872 A1* | 5/2009 | Jorgenson et al. | 455/334 |
| 2009/0140860 A1* | 6/2009 | Forster | 340/572.1 |
| 2009/0184838 A1 | 7/2009 | Jeon et al. | |
| 2009/0289771 A1 | 11/2009 | Tuttle | |
| 2010/0148926 A1 | 6/2010 | Kang et al. | |
| 2010/0148965 A1 | 6/2010 | Alexis et al. | |
| 2011/0025506 A1 | 2/2011 | Smith et al. | |
| 2011/0273273 A1 | 11/2011 | Liu | |
| 2012/0268327 A1 | 10/2012 | Sardariani et al. | |
| 2012/0319821 A1 | 12/2012 | Karttaavi et al. | |
| 2013/0035047 A1 | 2/2013 | Chen et al. | |
| 2013/0176115 A1 | 7/2013 | Puleston et al. | |

OTHER PUBLICATIONS

Non-Final Office Action for U.S. Appl. No. 13/196,877, mailed on Nov. 8, 2013 and filed Aug. 2, 2011.

* cited by examiner

*RFID SYSTEM*

*RFID TAG*

SIGNAL PATH DURING R→T

SIGNAL PATH DURING T→R

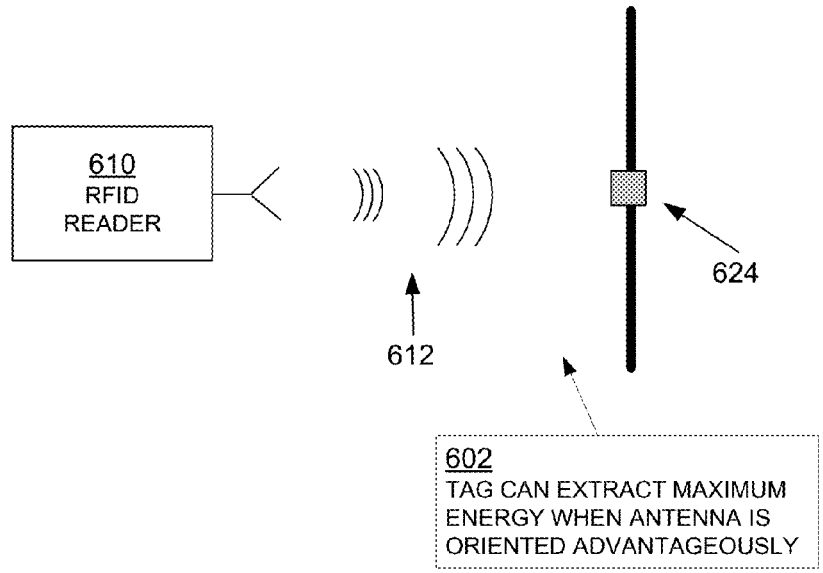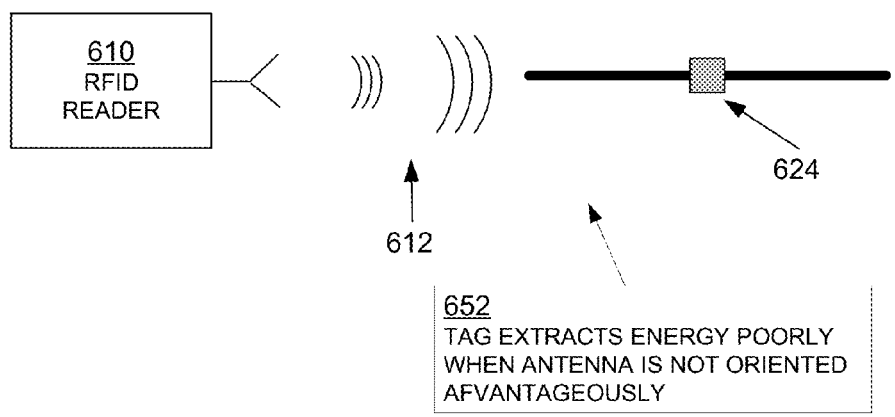
FIG. 6  *EFFECT OF ANTENNA ORIENTATION IN SINGLE ANTENNA TAGS*

IDEALIZED DUAL-ANTENNA TAG SHOULD EXHIBIT NO ORIENTATION SENSITIVITY AS THE TAG IS ROTATED IN THE ENERGIZING FIELD

REPRESENTATIVE SMALL DUAL-ANTENNA TAG WITH SHARED REFERENCE POTENTIAL

REPRESENTATIVE DUAL-ANTENNA TAG WITH COMMON REFERENCE POTENTIAL EXHIBITS SIGNIFICANT ORIENTATION SENSITIVITY AS THE TAG IS ROTATED IN THE ENERGIZING FIELD

1174

REPRESENTATIVE SMALL DUAL-DIFFERENTIAL TAG WITH ISOLATED REFERENCE POTENTIAL

REPRESENTATIVE DUAL-DIFFERENTIAL TAG WITH ISOLATED REFERENCE POTENTIAL SHOWING MINIMAL ORIENTATION SENSITIVITY AS THE TAG IS ROTATED IN THE ENERGIZING FIELD

FOUR PORT TAG IC WITH FOUR ANTENNA SEGMENTS

RFID TAG CIRCUITS WITH FLOATING DIFFERENTIAL INPUTS

CROSS REFERENCE TO RELATED APPLICATIONS

This application claims the benefit of U.S. Provisional Patent Application Ser. No. 61/093,252 filed on Aug. 29, 2008. The disclosure of the provisional patent application is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

The amount of energy that a tag can extract from an incident electromagnetic field varies with the orientation of the tag's antenna relative to the electromagnetic field. In certain orientations, a passive tag may not be able to extract sufficient energy to power itself. As a result, a reader's ability to read tags within its field of view may be reduced depending on the orientation of the tag antenna relative to the reader antenna. Some tags include two antennas with different orientations to increase the tag's ability to extract power from the incident field; these tags are often called dual-antenna tags. In conventional dual-antenna tags the antenna ports within an integrated circuit (IC) of the tag share a reference potential. Unfortunately, as the tag dimensions become small relative to the wavelength of the electromagnetic radiation, the tag antennas couple electromagnetically and, as a consequence of the shared reference potential, act electrically like a single antenna, thereby negating the orientation-insensitivity benefits of the dual antennas.

BRIEF SUMMARY

This summary introduces a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an Integrated Circuit (IC) for an RFID tag, and an RFID tag including such an IC, where the IC includes at least two rectifiers and at least two antenna ports for connecting to at least two antennas, with the antenna ports being electrically isolated from each other.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which:

FIG. 6 illustrates disadvantageous effects of antenna orientation in single-antenna tags.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
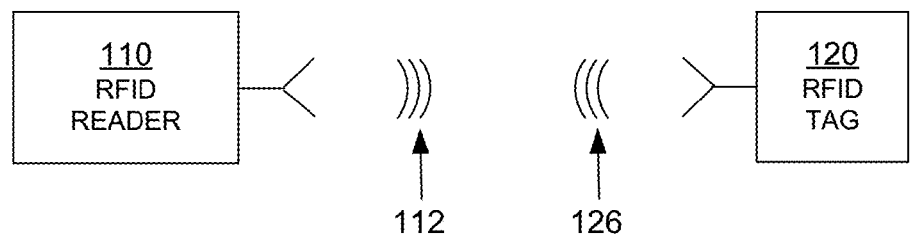
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
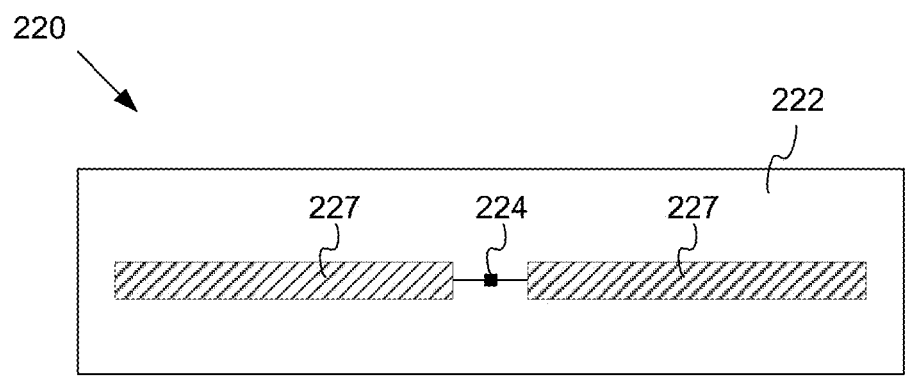
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
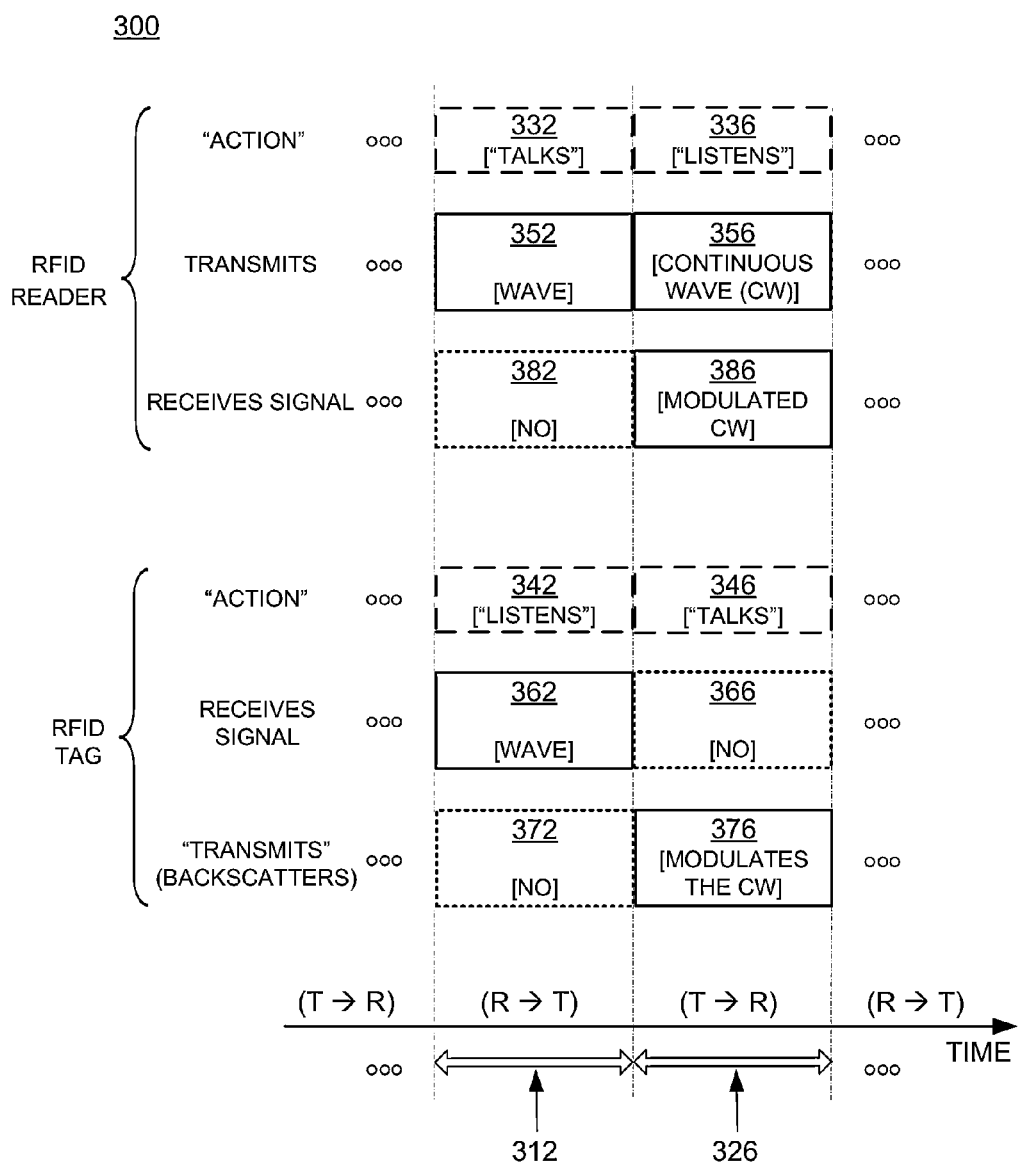
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
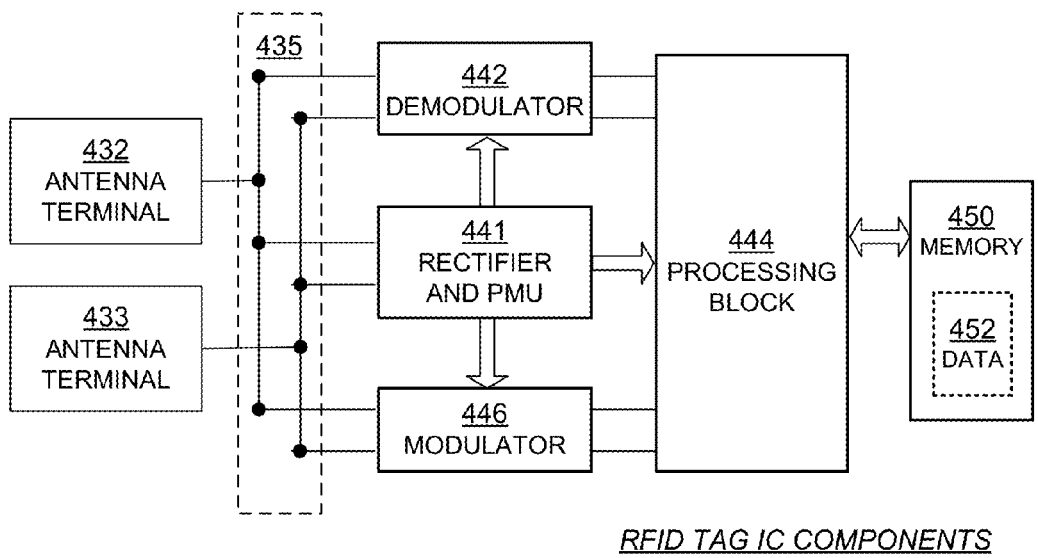
FIG. 4 is a block diagram showing a detail of an RFID tag, such as the one shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna terminals 432, 433, which are suitable for coupling to one or more antenna segments (not shown in FIG. 4). Antenna terminals 432, 433 may be made in any suitable way, such as using pads and so on. In a number of embodiments more than two antenna terminals are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF power received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
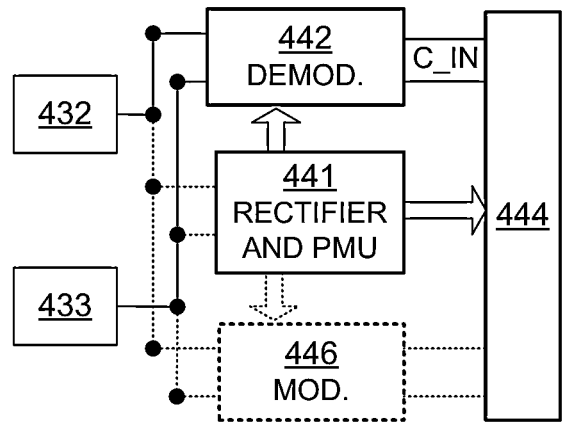
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received from antenna terminals 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
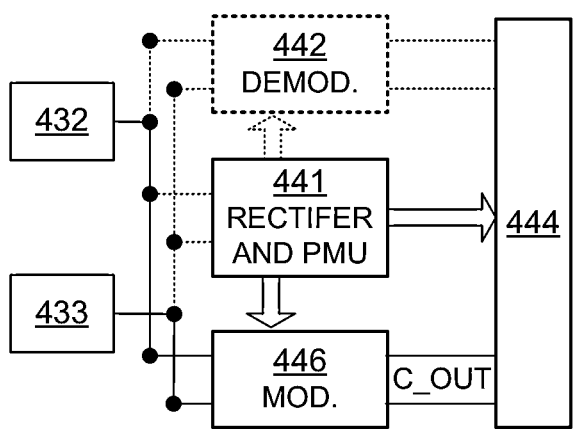

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

FIG. 6 illustrates the disadvantageous effects of antenna orientation in single antenna tags.

As mentioned previously, the amount of energy that a tag can extract from an incident electromagnetic field varies with the orientation of the tag antenna relative to the electromagnetic field. In certain orientations, a tag may be able to extract sufficient energy to power itself, facilitating a reader's ability to read the tag. In other orientations, a tag may not be able to extract sufficient energy to power itself, reducing a reader's ability to read the tag. As shown in the example of diagram 600, tag 624 with its antenna positioned parallel to electromagnetic wave 612 transmitted from reader 610 can extract maximum energy from the incident field (602).

According to the counter example in diagram 650, tag 624's antenna is positioned perpendicular to electromagnetic wave 612 transmitted by reader 610. In this case, the energy that the tag can extract from the incident field is minimized. In such situations, it is likely that the tag will not have sufficient power to operate and the reader will not be able to read or perform other operations with the tag (652).

While the antennas of the example tags in diagrams 600 and 650 are shown as dipoles, the same problem may occur with tags employing different types of antennas.

Figure 7:
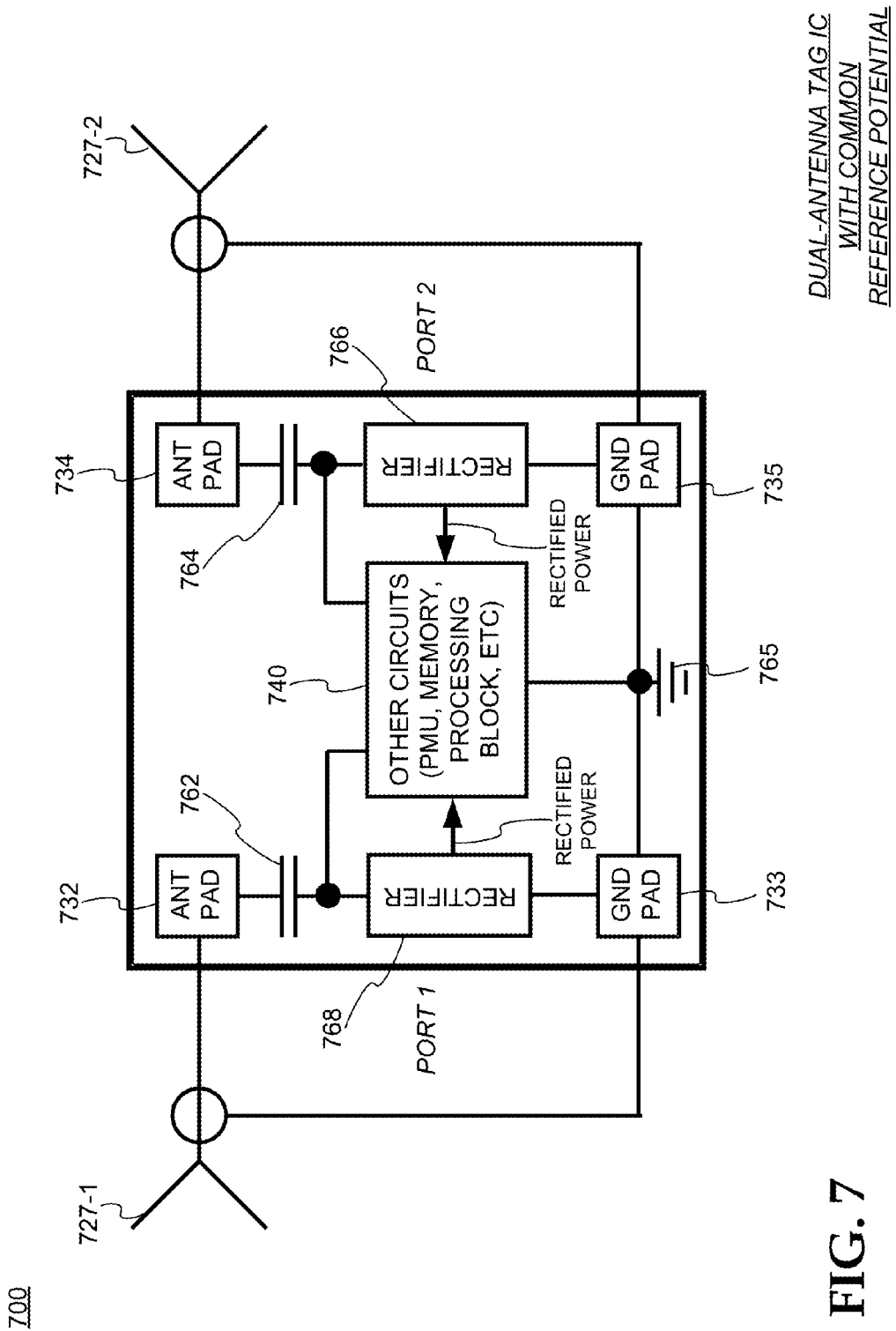
FIG. 7 is a block diagram illustrating a dual-antenna RFID IC.

FIG. 7 is a block diagram 700 illustrating a dual-antenna RFID tag IC. The IC shown in diagram 700 includes two ports defined by antenna terminals (pads) 732, 733 (port 1) and 734, 735 (port 2), respectively, for connection to two antennas 727-1 and 727-2. One or both of the antennas coupled to rectifiers 766 and 768 can provide power for tag operations. Two of the terminals, one for each of port 1 and port 2, are capacitively coupled to their respective rectifiers through capacitors 762 and 764. In conventional dual-antenna tag designs, a shared reference potential 765 (often the IC reference potential, commonly referred to as ground) is coupled to the other two of the terminals (e.g. 733 and 735). Other circuits 740 of the tag may be coupled to these terminals as well, for example a demodulator for symbol demodulation.

Figure 8A:
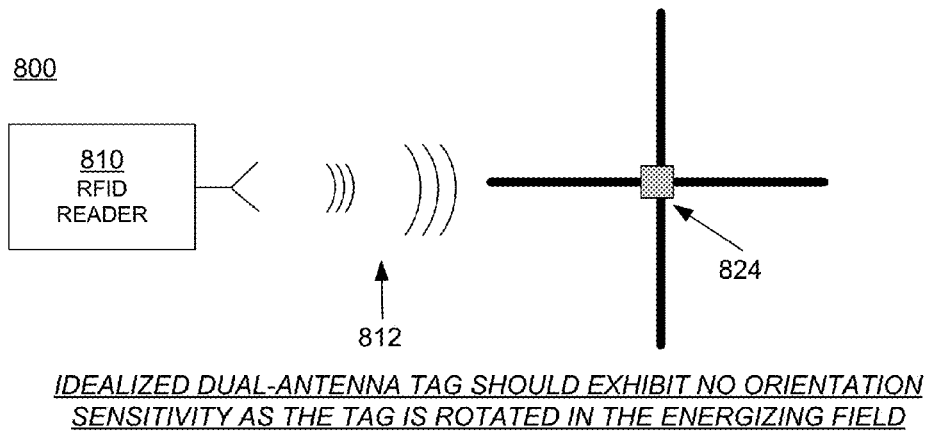
FIGS. 8A, 8B, and 8C illustrate disadvantageous effects of electromagnetic coupling between antennas in dual-antenna tags where the antenna ports share a reference potential.

FIGS. 8A/8B/8C illustrates the disadvantageous effects of electromagnetic coupling between antennas in dual-antenna tags where the antenna ports share a reference potential.

As shown in diagram 800 of FIG. 8A, tag IC 824 is coupled to two antennas to decrease the tag's orientation sensitivity relative to incident wave 812 transmitted by reader 810. In an ideal scenario, as one of the antennas' performance decreases due to its orientation relative to the incident wave 812, the other antenna's performance would increase. By using both antennas simultaneously, the tag 824 can increase its ability to extract sufficient energy to power itself and be read by reader 810.

However, as the antenna dimensions become small (as is often required when tagging small items) relative to the wavelength of the incident wave, the two antennas couple electromagnetically as a consequence of the shared common reference within IC 824, and act electrically like a single antenna. The orientation insensitivity of the tag is reduced, resulting in the problems discussed previously for a single-antenna tag.

Figure 8B:
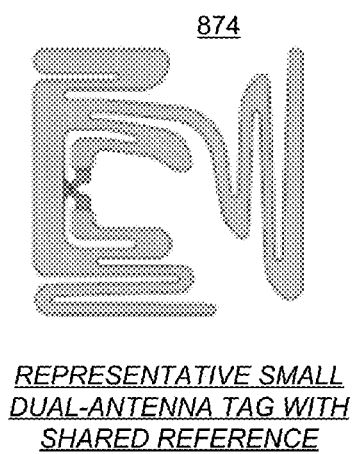

FIG. 8B illustrates a representative dual-antenna tag 874, sized for tagging small items.

Figure 8C:
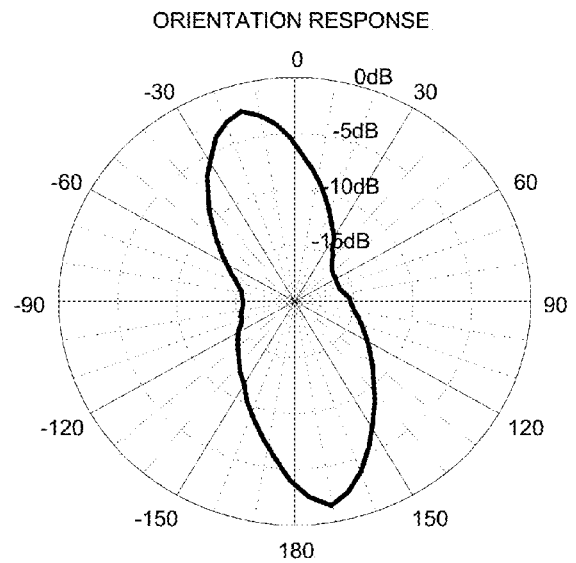

FIG. 8C illustrates the sensitivity of tag 874 as the tag is rotated in an incident electromagnetic field. As can be observed, tag 874 is quite sensitive to its orientation in the electromagnetic field.

Figure 9:
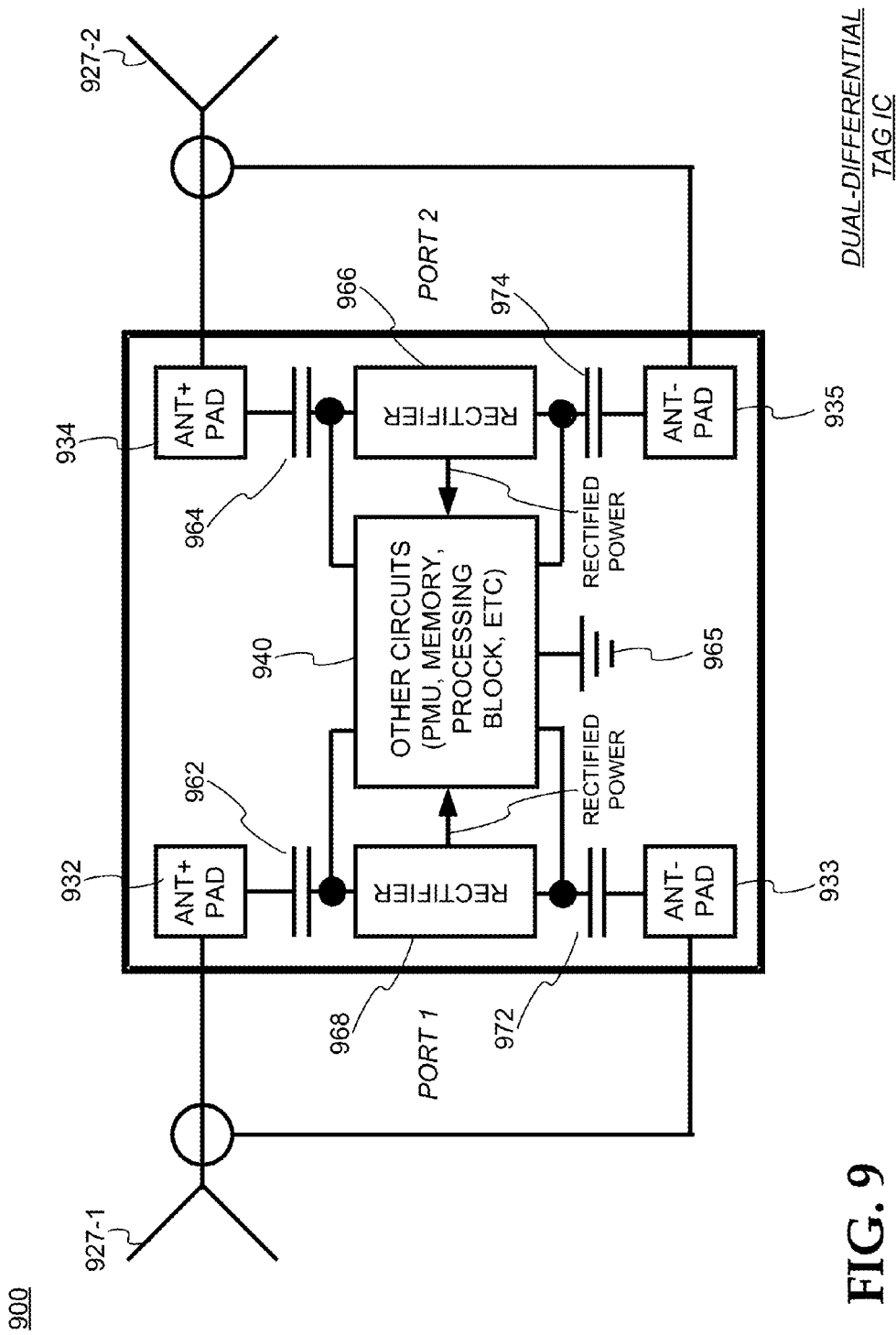
FIG. 9 illustrates a dual-differential RFID IC according to one embodiment.

FIG. 9 illustrates a dual-differential RFID tag IC according to one embodiment. The IC shown in diagram 900 includes antenna terminals (pads) 932 and 933 (port 1) coupled to antenna 927-1, and antenna terminals (pads) 934 and 935 (port 2) coupled to antenna 927-2. Rectifiers 966 and 968 rectify the electromagnetic energy incident on the antennas to power the tag circuits 940. Tag circuits 940 may include a reference potential 965.

Differently from the IC of FIG. 7, all four terminals (pads 932-935 of IC 900) are capacitively coupled to the rectifiers through capacitors 962, 972, 964, 974, and none are directly coupled to each other or to the tag reference potential 965. By severing the on-chip connection that tied two of the terminals together (one each from port 1 and port 2), the two ports become electrically isolated, and the two antennas 927-1 and 927-2 likewise become electrically isolated. The two antennas can float electrically relative to each other and to the other circuits on the IC, and can develop different potentials across them. By convention, two ports are said to be electrically isolated if an odd-mode excitation of one port results in substantially no odd-mode coupling to the other port.

Coupling capacitors 962, 972, 964, and 974, in combination with severing the connections between the IC terminals and the reference potential, further facilitate the electrical isolation between the ports by allowing the IC terminals to develop DC potentials that are different from the rectifier input potentials.

The port configuration in IC 900, exhibiting mirror-image symmetry about a single axis, is referred to as an "H" configuration for dual-differential tags.

Figure 10:
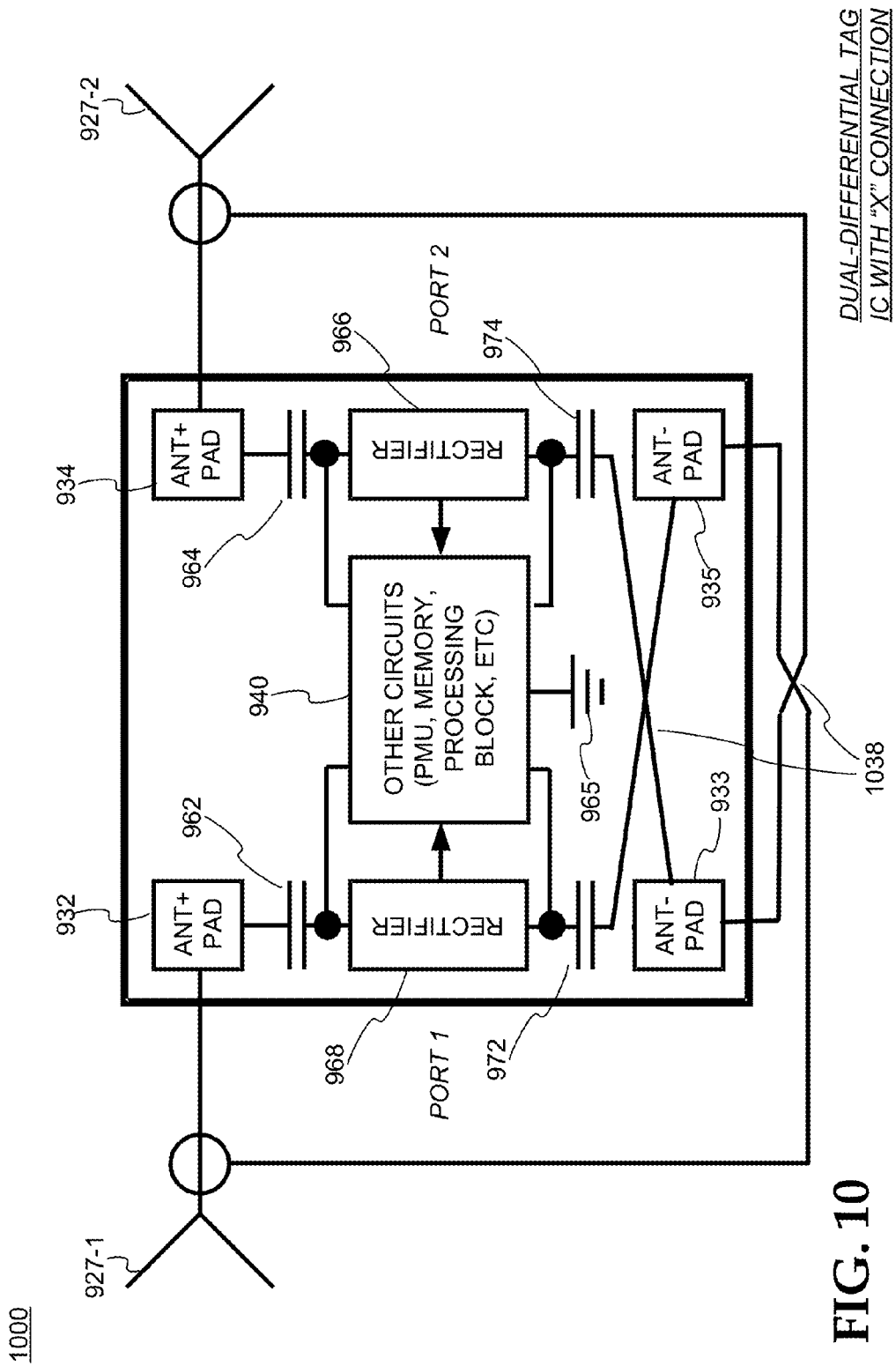
FIG. 10 illustrates another dual-differential RFID IC with cross-connected antenna ports according to another embodiment.

FIG. 10 illustrates another dual-differential tag IC with cross-connected antennas according to another embodiment. The components and the functionality of the IC displayed in diagram 1000 are similar to those numbered likewise in diagram 900 of FIG. 9.

Differently from the IC of diagram 900, terminals 933 and 935 of the IC in diagram 1000 are cross-coupled (1038) to their respective antennas and capacitors (e.g. antenna 927-1 to terminal 935 to capacitor 972). This configuration is referred to a an "X" configuration.

A functionality of the RFID tag IC is substantially the same for the H and X configurations. However, the terminals which define a port are different between the two configurations. The H configuration defines a port between two adjacent terminals and is used in conjunction with dual-antenna designs that take advantage of diversity in their modes of energy transfer, such as a dipole on one port and a loop antenna on another port. In such a case, the dominant electric field vectors for the two modes are parallel. The X configuration, on the other hand, defines a port between two diagonal terminals and is used in conjunction with dual-antenna designs that take advantage of diversity in the polarization of the field to which they are responsive, such as orthogonal collocated dipoles. In such a case, the dominant electric field vectors for the two modes are perpendicular.

Figure 11A:
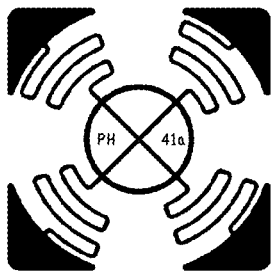
FIGS. 11A and 11B illustrate advantageous effects of electromagnetic isolation between antennas in dual-differential tags where the antenna ports do not share a reference potential.

FIGS. 11A/11B illustrates the advantageous effects of electromagnetic isolation between antennas in dual-differential tags in which the antennas ports are electrically isolated from each other. Even when the antenna dimensions are small relative to the wavelength of the incident electromagnetic wave, the antennas act independently and the benefit of differently oriented antennas is preserved.

FIG. 11A illustrates a representative dual-differential tag 1174, sized for tagging small items.

Figure 11B:
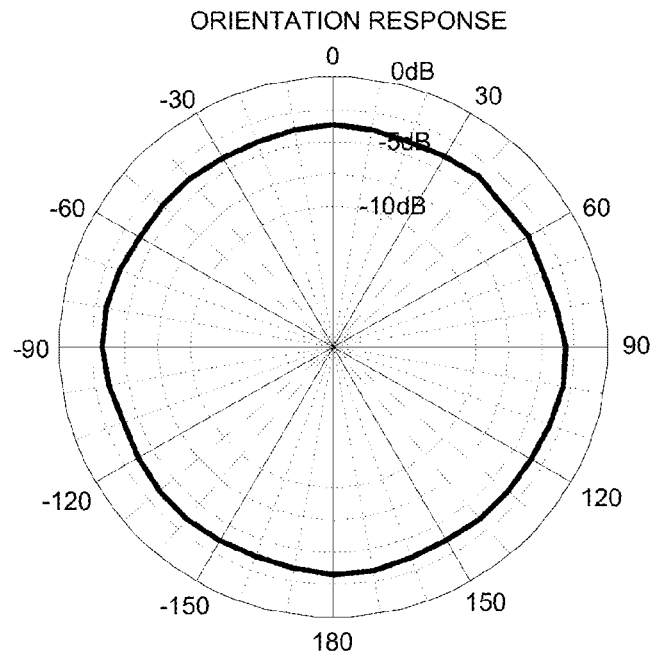

FIG. 11B illustrates the sensitivity of tag 1174 as the tag is rotated in an incident electromagnetic field. As can be observed, tag 1174 is quite insensitive to its orientation in the electromagnetic field.

Antennas of a tag according to embodiments may be designed in any form and are not limited to dipoles. Furthermore, according to embodiments the coupling capacitors may be located on or off the IC, may have suitable capacitance values, and may be selected based on parameters such as substrate type, fabrication methods, antenna type, circuit performance, and other circuit and capacitor characteristics.

Embodiments may also include methods of manufacturing a tag as described herein. These methods may be performed in conjunction with one or more human operators. These human operators need not be collocated with each other, but each can be only with a machine that performs a portion of the manufacturing.

Embodiments for manufacturing a tag as described herein may additionally include programs, and methods of operation of the programs. A program is generally defined as a group of steps or operations leading to a desired result, due to the nature of the elements in the steps and their sequence.

Performing the steps, instructions, or operations of a program as discussed above requires manipulation of physical quantities. Usually, though not necessarily, these quantities may be transferred, combined, compared, and otherwise manipulated or processed according to the steps or instructions, and they may also be stored in a machine-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Programs for manufacturing a tag according to embodiments may furthermore include storage media. Such media, individually or in combination with others, have stored thereon instructions of a program made according to the embodiments. A storage medium according to the embodiments is a machine-readable medium such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a machine-readable medium, it should be clear to a person skilled in the art that it need not be a single memory, or even a single machine. Various portions, modules or features of it may reside in separate memories, or even separate machines.

Often, for the sake of convenience only, it is desirable to implement and describe a program for manufacturing a tag according to embodiments as software. The software can be unitary, or thought in terms of various interconnected distinct software modules.

Embodiments of an RFID tag as described herein can be implemented as hardware, software, firmware, or any combination thereof. It is advantageous to consider such a tag as subdivided into components or modules. A person skilled in the art will recognize that some of these components or modules can be implemented as hardware, some as software, some as firmware, and some as a combination.

According to one embodiment, an IC for an RFID tag, configured to communicate with an RFID reader, includes electrical circuits, a reference potential for the electrical circuits, four antenna terminals, a first port comprising two of the antenna terminals, a second port comprising a different two of the antenna terminals, and in which the first port and the second port are electrically isolated. All four antenna terminals may be unconnected to the reference potential, and the pairing of the antenna terminals may be in an X or H configuration according to embodiments.

A near-field antenna may be coupled to one port and a far-field antenna may be coupled to the other port. Alternatively, far-field antennas may be coupled to each of the ports. The far-field antennas may be dipoles coupled in an X configuration as in tag 1174. In a further embodiment, a single segmented antenna may be coupled to more than two of the antenna terminals.

The IC may include two or more rectifiers, where all of the antenna terminals are capacitively coupled to the rectifiers. According to yet another embodiment, the IC may include more than two rectifiers, each rectifier being coupled between two adjacent antenna terminals. The IC may include additional rectifiers coupled between non-adjacent antenna terminals. The IC may even include more than four antenna terminals.

The rectifiers may be coupled to other circuits of the IC which may include a power management unit, a processor, and/or a memory, where the other circuits are coupled to the reference potential. The reference potential may be further coupled to a semiconductor substrate of the IC.

Embodiments for an IC of an RFID tag may include at least two antenna ports defined by respective pairs of antenna terminals for connecting to at least two respective antennas, and at least two rectifiers, wherein each of the antenna ports is capacitively coupled to a rectifier. The capacitive coupling may be achieved through distributed capacitance disposed in a substrate of the IC, by lumped capacitances disposed in conductive layers of the IC, by metal-oxide semiconductor (MOS) capacitors disposed in the IC, by an intrinsic input capacitance of a rectifier itself, by capacitive elements disposed external to the IC, by capacitances intrinsic to the antennas, or by other means as will be well known to those skilled in the art. Embodiments may include an RFID tag with an IC as described above and at least two antennas coupled to the antenna ports.

Figure 12:
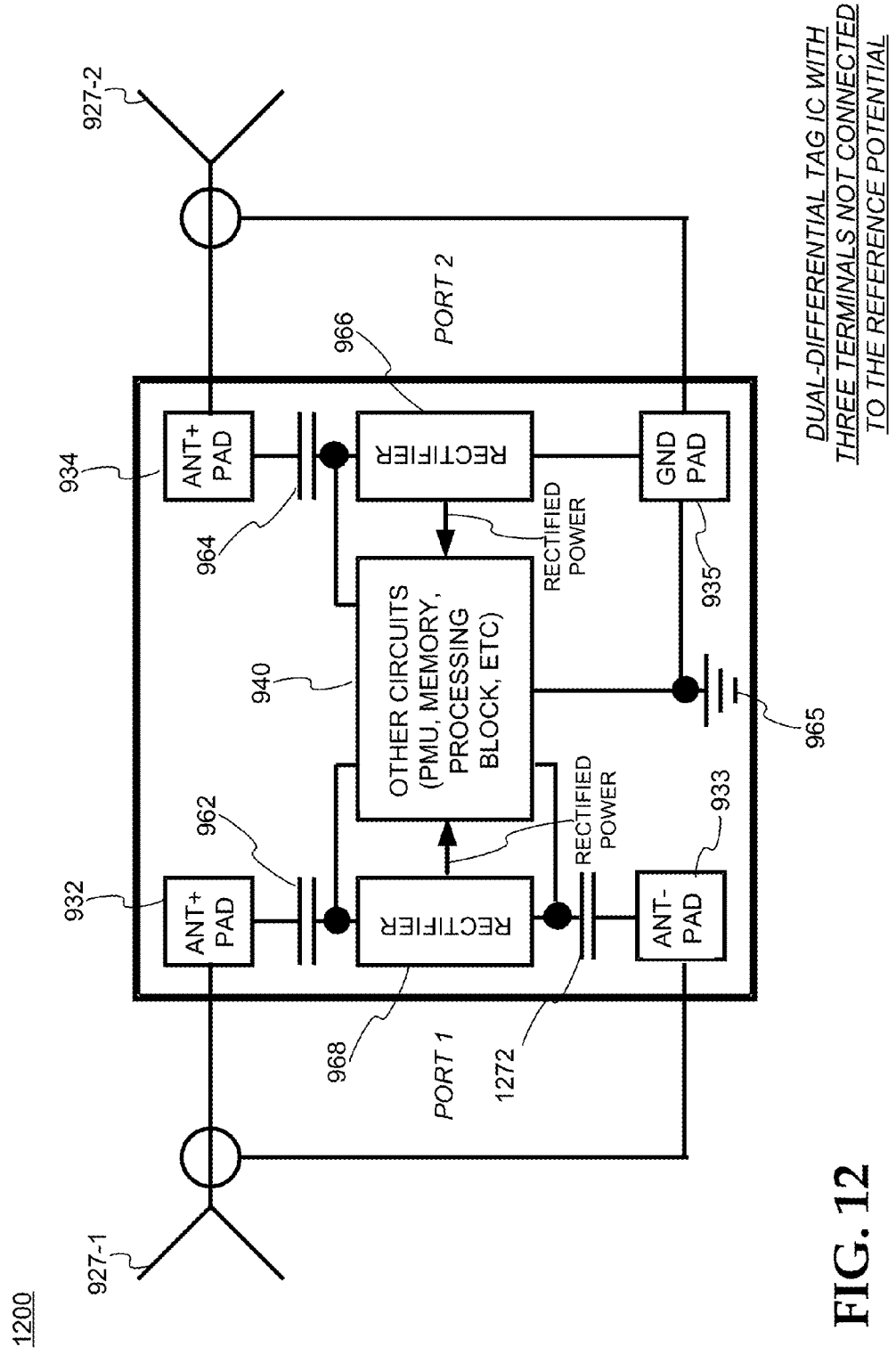
FIG. 12 illustrates a further dual-differential RFID IC according to a further embodiment.

FIG. 12 illustrates a dual-differential tag IC according to embodiments.

The IC shown in diagram 1200 includes antenna terminals 932 and 933 (port 1) coupled to antenna 927-1, and antenna terminals 934 and 935 (port 2) coupled to antenna 927-2. Rectifiers 966 and 968 rectify the electromagnetic energy incident on the antennas to power the tag circuits 940. Tag circuits 940 may include a reference potential 965.

Differently from the IC of diagram 900, the IC in diagram 1200 has only three of its four antenna terminals (932, 933, and 934) capacitively coupled to the rectifiers, and only three of its four antenna terminals (932, 933, and 934) not connected to reference potential 965. Antenna terminal 935 (also referred to as a ground pad) is directly coupled to rectifier 966 and to reference potential 965. This configuration still isolates port 1 from port 2 electrically, but does not isolate port 2 from the electrical circuits of the IC. Regardless, antennas 927-1 and 927-2 may still act independently even when their dimensions are small relative to the wavelength of the incident electromagnetic wave. As will be obvious to those skilled in the art, other embodiments are possible, such as ground pad 935 connected to reference potential 965 but capacitively coupled to rectifier 966.

Figure 13:
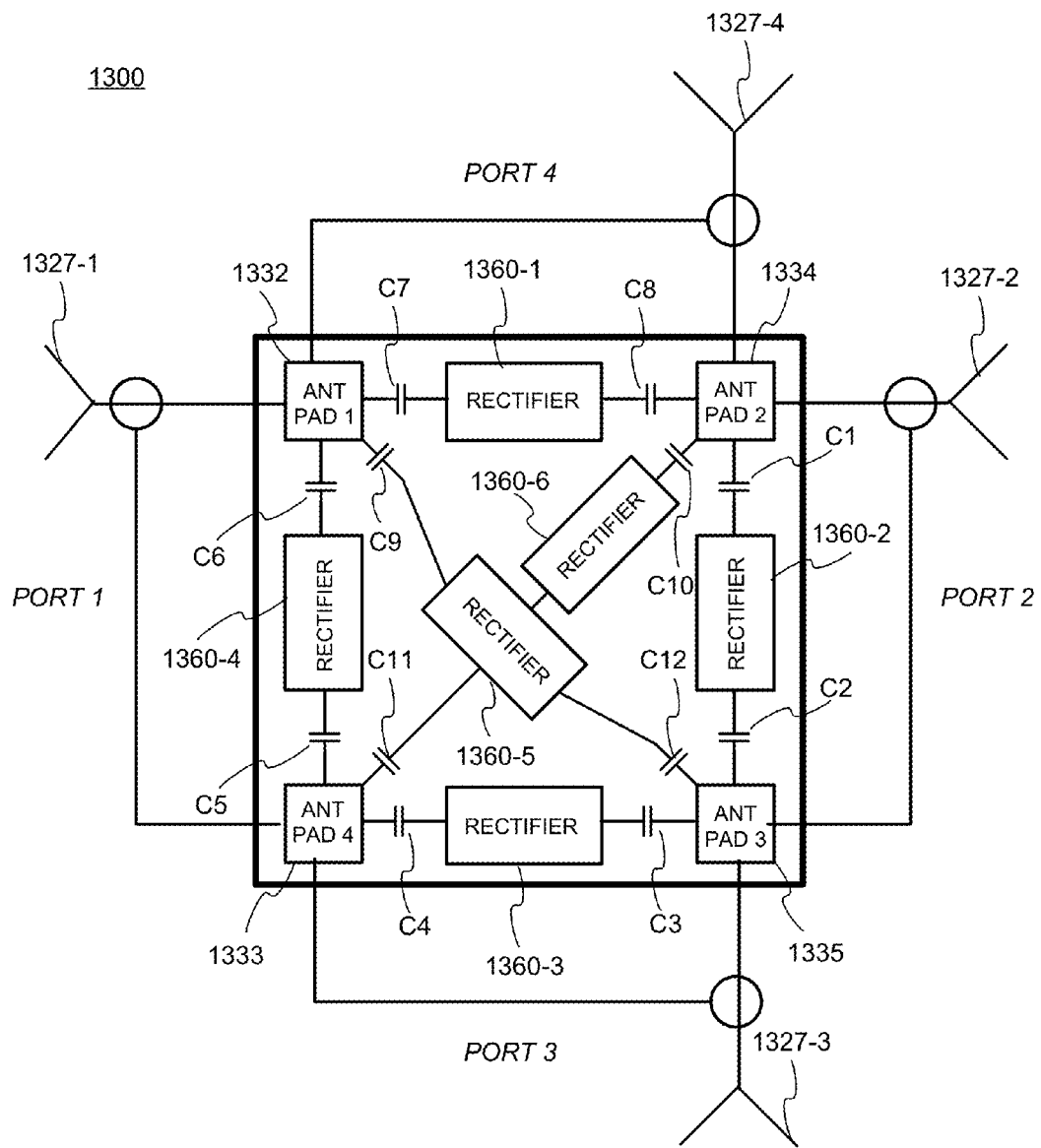
FIG. 13 illustrates an example four antenna RFID IC with six rectifiers according to yet another embodiment.

FIG. 13 illustrates an example four antenna tag IC containing six rectifiers according to yet another embodiment.

The IC shown in diagram 1300 includes six antenna ports with each antenna port being defined by two respective antenna terminals for connection to distinct antennas. Thus, antenna terminals 1332 and 1333 constitute port 1 connecting to antenna 1327-1, antenna terminals 1334 and 1335 constitute port 2 connecting to antenna 1327-2, antenna terminals 1333 and 1335 constitute port 3 connecting to antenna 1327-3, and antenna terminals 1332 and 1334 constitute port 4 connecting to antenna 1327-4. Furthermore, antenna terminals 1332 and 1335, and also 1333 and 1334, also constitute two respective ports through the diagonally positioned rectifiers 1360-5 and 1360-6 (not labeled with port numbers in FIG. 13).

The rectifiers are configured as follows: rectifier 1360-1 is between antenna terminals 1332 and 1334, each of which are capacitively coupled to the rectifier by capacitors C7 and C8; rectifier 1360-2 is between antenna terminals 1334 and 1335, each of which are capacitively coupled to the rectifier by capacitors C1 and C2; rectifier 1360-3 is between antenna terminals 1335 and 1333, each of which are capacitively coupled to the rectifier by capacitors C3 and C4; rectifier 1360-4 is between antenna terminals 1333 and 1332, each of which are capacitively coupled to the rectifier by capacitors C5 and C6; rectifier 1360-6 is between antenna terminals 1333 and 1334, each of which are capacitively coupled to the rectifier by capacitors C11 and C10; and rectifier 1360-5 is between antenna terminals 1332 and 1335, each of which are capacitively coupled to the rectifier by capacitors C9 and C12.

In the configuration of diagram 1300, the rectifiers can convert power incident on any port, and the IC is sensitive to both odd-mode and even-mode excitation of its ports. Moreover, the IC can be placed in any position on the antennas. Thus, the IC of diagram 1300 represents a complete, symmetric configuration. As will be obvious to those skilled in the art, it is possible to configure an IC with fewer ports than shown in diagram 1300, or with even more antenna terminals and more ports.

Figure 14:
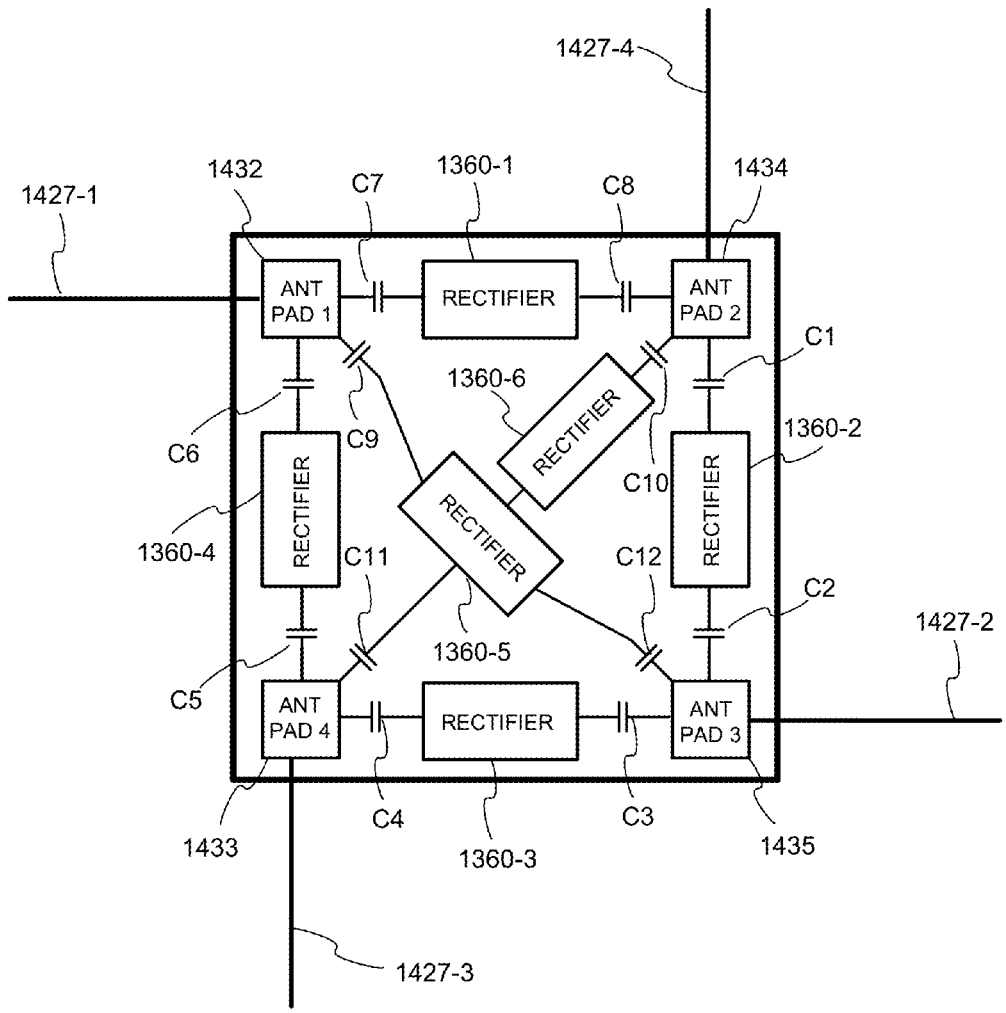
FIG. 14 illustrates an example four dipole RFID tag according to a yet further embodiment.

FIG. 14 illustrates an example multi-dipole tag according to a further embodiment.

In the example configuration displayed in diagram 1400, rectifiers 1360-1 through 1360-6 in conjunction with coupling capacitors C1 through C12 provide rectification for antennas 1427-1 through 1427-4 connected to antenna terminals 1432, 1435, 1433, and 1434, respectively. Each antenna terminal is coupled to a single antenna segment. As can be seen by careful inspection, the rectifiers in this configuration are able to extract power from both even- and odd-mode excitation of antenna pairs, unlike the IC of diagram 900 which can only convert power in odd-mode excitations, yet the antenna terminals remain unconnected to the IC's reference potential.

For clarity, other tag circuits are not shown in diagrams 1300 and 1400 of FIGS. 13 and 14. As with the previous example embodiments, the rectifiers, ports, and antennas according to embodiments may be configured in a different manner using the principles described herein.

The above specification, examples, and data provide a complete description of the composition, manufacture, and use of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. An Integrated Circuit (IC) for a Radio Frequency Identification (RFID) tag configured to communicate with an RFID reader, the IC comprising:
   a first input coupled to a first rectifier and comprising a first IC terminal and a second IC terminal; wherein
      the first IC terminal is coupled to the first rectifier through a first coupling capacitor; and
      the second IC terminal is coupled to the first rectifier through a second coupling capacitor; and
   a second input coupled to a second rectifier and comprising a third IC terminal and a fourth IC terminal; wherein
      the third IC terminal is coupled to the second rectifier through a third coupling capacitor; and
      the fourth IC terminal is coupled to the second rectifier; wherein
   the first input and the second input are not directly coupled to and do not share a common reference potential on the IC prior to or at their respective couplings to the first and second rectifiers, such that an odd-mode excitation signal at the first input results in substantially no coupling of the signal to the second input through the IC.

2. The IC of claim 1, further including a reference potential, and wherein at least three of the four IC terminals are disconnected from the reference potential.

3. The IC of claim 1, wherein the first and second inputs form an X configuration of the IC terminals.

4. The IC of claim 1, wherein a first antenna is coupled to the first input and a second antenna is coupled to the second input.

5. The IC of claim 4, wherein the first antenna is a near-field antenna and the second antenna is a far-field antenna.

6. The IC of claim 4, wherein both the first and second antennas are far-field antennas.

7. The IC of claim 2, further including a power management unit (PMU), wherein at least one of the first and second rectifiers is coupled to the PMU, and the PMU is coupled to the reference potential.

8. The IC of claim 2, wherein the first and second rectifiers are coupled to the reference potential.

9. The IC of claim 1, in which the fourth IC terminal is also disconnected from the reference potential.

10. An Integrated Circuit (IC) for a Radio Frequency Identification (RFID) tag configured to communicate with an RFID reader, the IC comprising:
   a first input coupled to a first rectifier and comprising a first IC terminal and a second IC terminal; wherein
      the first IC terminal is coupled to the first rectifier through a first coupling capacitor; and
      the second IC terminal is coupled to the first rectifier through a second coupling capacitor; and
   a second input coupled to a second rectifier and comprising a third IC terminal and a fourth IC terminal; wherein
      the third IC terminal is coupled to the second rectifier through a third coupling capacitor; and
      the fourth IC terminal is coupled to the second rectifier through a fourth coupling capacitor; wherein
   the first input and the second input are not directly coupled to and do not share a common reference potential on the IC prior to or at their respective couplings to the first and second rectifiers, such that an odd-mode excitation signal at the first input results in substantially no coupling of the signal to the second input through the IC.

11. The IC of claim 10, wherein at least one of the first, second, third, and fourth coupling capacitors is located on the IC.

12. The IC of claim 10, wherein at least one of the first, second, third, and fourth coupling capacitors is located off the IC.

13. A Radio Frequency Identification (RFID) tag configured to communicate with an RFID reader, the tag comprising:
   a first antenna and a second antenna; and
   an integrated circuit (IC) including:
      a first input coupled to the first antenna and to a first rectifier, and comprising a first IC terminal and a second IC terminal; wherein
         the first IC terminal is coupled to the first rectifier through a first coupling capacitor; and
         the second IC terminal is coupled to the first rectifier through a second coupling capacitor; and
      a second input coupled to the second antenna and to a second rectifier, and comprising a third IC terminal and a fourth IC terminal; wherein
         the third IC terminal is coupled to the second rectifier through a third coupling capacitor; and
         the fourth IC terminal is coupled to the second rectifier; wherein
      the first input and the second input are not directly coupled to and do not share a common reference potential on the IC prior to or at their respective couplings to the first and second rectifiers, such that an odd-mode excitation signal at the first input results in substantially no coupling of the signal to the second input through the IC.

14. The RFID tag of claim 13, further including a reference potential, wherein at least three of the IC terminals are disconnected from the reference potential.

15. The tag of claim 13, wherein the first antenna is a far-field antenna and the second antenna is one of a near-field antenna and a far-field antenna.

16. The tag of claim 14, further including a power management unit (PMU), and wherein:
   the first and second rectifiers are coupled to the reference potential;

at least one of the first and second rectifiers is coupled to the PMU; and the PMU is coupled to the reference potential.

17. A Radio Frequency Identification (RFID) tag configured to communicate with an RFID reader, the tag comprising:
- a first antenna and a second antenna; and
- an integrated circuit (IC) including:
  - a first input to the IC coupled to the first antenna and to a first rectifier, and comprising a first IC terminal and a second IC terminal; wherein
    - the first IC terminal is coupled to the first rectifier through a first coupling capacitor; and
    - the second IC terminal is coupled to the first rectifier through a second coupling capacitor; and
  - a second input to the IC coupled to the second antenna and to a second rectifier, and comprising a third IC terminal and a fourth IC terminal; wherein
    - the third IC terminal is coupled to the second rectifier through a third coupling capacitor; and
    - the fourth IC terminal is coupled to the second rectifier through a fourth coupling capacitor; wherein
  - the first input and the second input are not directly coupled to and do not share a common reference potential on the IC prior to or at their respective couplings to the first and second rectifiers, such that an odd-mode excitation signal at the first input results in substantially no coupling of the signal to the second input through the IC.

18. The tag of claim 17, wherein the first and second antennas are configured such that the tag is substantially responsive to an electromagnetic field regardless of its orientation to the electromagnetic field.

19. The tag of claim 17, wherein the first and second antennas comprise crossed dipoles sharing a common loop.

* * * * *